MAGNETIC THIN FILM READOUT SYSTEM

Filed Dec. 19, 1962 2 Sheets-Sheet 1

United States Patent Office 3,387,289

Patented June 4, 1968

3,387,289
MAGNETIC THIN FILM READOUT SYSTEM

Karlheinz Walter, Munich, Germany, assignor to Siemens Aktiengesellschaft, Munich, Germany, a corporation of Germany Filed Dec. 19, 1962, Ser. No. 245,814
Claims priority, application Germany, Dec. 22, 1961, S 77,252
2 Claims. (Cl. 340—174)

The invention disclosed herein relates to a data reading method and is particularly concerned with a method of reading, reproducibly and as often as desired, magnetic conditions in thin magnetizable layers.

Thin magnetizable layers of this kind which may, for example, consist of permalloy with a thickness of about 1000 A., are generally provided upon an insulating support, for example, made of glass and serve in modern data storage technique, for example, in computers, as rapidly operable storage or circuit elements.

These magnetizable layers exhibit a preferential magnetic direction. Magnetic fields can by suitable current impulses be produced in given conduction tracks, the magnetic layer being upon disconnection of the impulses magnetized in the preferential direction or opposite thereto. These two magnetic conditions serve for the storing of information, for example, in one direction as "Yes" and in the other direction as "No." Further lines over which reading or readout impulses are transmitted, and so-called reading loops, serve for ascertaining the magnetization conditions in the thin layer.

It has now been found that, upon using suitable but not too strongly dimensioned reading impulses, these thin magnetizable layers cannot practically be read out as often as desired without losing the information content.

It may happen that the layer, proceeding from the rim thereof or from preferred points, may be by a reading pulse slightly magnetized in opposite direction. In the presence of succession of a greater number of such reading pulses, the region of this opposite magnetization will increase until an exact reading out of the stored information is made impossible. The information is in this manner broken down and the desired reproducibility of the reading is destroyed. The breaking down of the information diminishes with the diminution of the reading field. However, the signal voltage diminishes likewise with the diminution of the reading field. The size of the reading field may be selected greatest exactly in the hard direction HR, that is, in the direction extending perpendicularly to the preferential magnetic direction LR, which will, however, depend upon a very accurate alignment of the preferential direction LR with respect to the reading field. It was found, in the case of matrix plates with a multitude of magnetic storage spots, that the preferential magnetic direction LR scatters from layer to layer. It is, accordingly, impossible to place the reading field exactly in the hard direction HR, since the reading field is generally produced by a current formed by a band conductor disposed above a layer line. It is therefore necessary to hold the reading field small so as to avoid breaking down of the information content.

The object of the invention is to provide an arrangement in which such thin magnetizable layers can be reproducibly read out as often as desired, and in which possibly occurring partial breakdown of the information is regenerated after each or after a series of reading pulses, without necessitating a rewriting of the information with the use of intermediate storers or feedback devices. The invention shall make it possible to use readout pulses with an amplitude which is well sufficient for the reading. In known reading processes, the impulse amplitude is often selected very low owing to the danger of destroying the information, such limitation resulting occasionally in unreliable reading operation.

There is already known a storage device for use in connection with magnet cores, whereby the read out information is over a feedback arrangement newly entered in the core, so that the corresponding core or cores can be read as often as desired. The present invention departs from this mode of operation by avoiding the use of relatively complicated feedback arrangements.

The invention proposes to allocate or to assign to the reading pulse or to a series of reading pulses, one or more oppositely polarized regeneration impulses which produce in the magnetizable layer a field which is oriented oppositely to the field produced by the reading pulses.

It is in this manner possible to cancel the change of magnetization which is by the reading pulses produced in a part of the magnetizable layer. The reading can be effected at the ascending flank of the reading pulse and also at the ascending flank, that is, at the inception of the oppositely polarized regeneration impulse.

It is according to the invention, particularly advantageous to conduct a regeneration impulse, in point of time after the reading pulse, over the same conduction path. It is thereby possible to use the same impulse generator for the reading pulse and for the regeneration pulse. A separate conduction of the reading- and regeneration-pulses along separate parallel conductors is likewise possible. It is also possible to conduct the regeneration impulse over the line in point of time ahead of the reading impulse.

Further details and features of the invention will appear from the description which is rendered below with reference to the accompanying drawings showing examples thereof.

Figure 3:
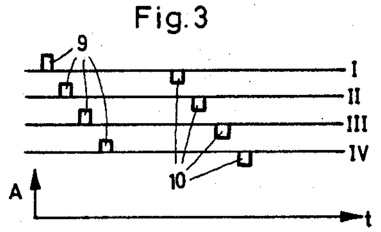
Figure 4:
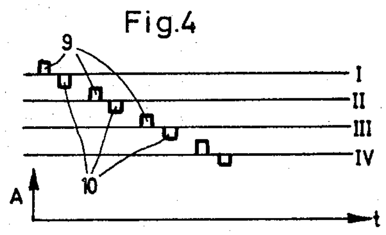
Figure 5:
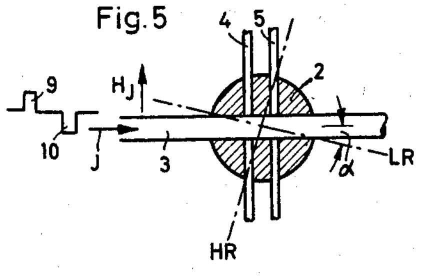

FIGS. 3 and 4 indicate examples for the allocation of the regeneration impulses;

FIG. 5 illustrates an individual thin magnetizable element jointly with the reading impulse line, the writing-in line and the reading loop;

FIGS. 6–9 show by way of example the manner in which the magnetization acts in the method according to the invention, in the case of a stored "Zero" corresponding to the "No" condition of the magnetizable layer; and FIGS. 10–13 represent an example of the manner in which the regeneration impulse affects the regenerative layer in the case, for example, of a stored "One" corresponding to the "Yes" condition of the storage layer.

Figure 1:
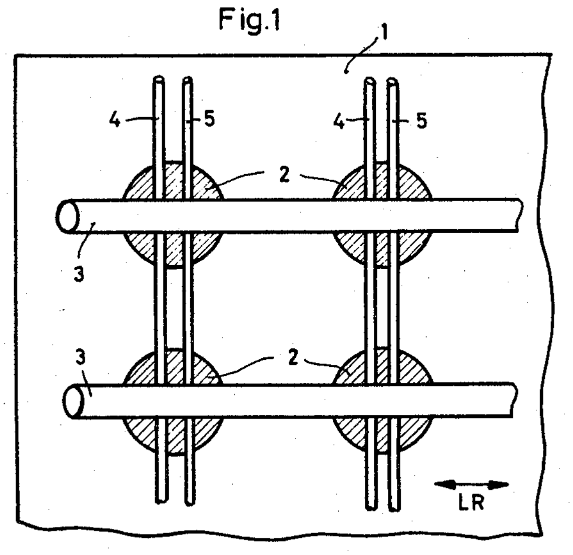
FIG. 1 shows a portion of a known matrix.

Referring now to FIG. 1, which shows a portion of a known matrix plate, numeral 1 indicates an insulating carrier body made of glass upon which are provided thin circular magnetizable layers 2 of permalloy with a thickness of about 1000 A. The magnetically preferential or "easy" direction is indicated by the letters LR. Various lines extend over these magnetizable layers in crossing and insulating relationship with respect thereto. The lines are mutually insulated, the insulating intermediate layers being for the sake of simplification omitted. There are provided socalled reading impulse lines 3, writing-in lines 4, and sensing loops 5. Reading pulses are extended over the reading impulse lines 3, such pulses producing a magnetizable field, the reading impulse field, extending perpendicularly to these lines. A voltage can thereby be produced in the sensing loops 5 responsive to a change of magnetization of the magnetizable layer.

Figure 2:
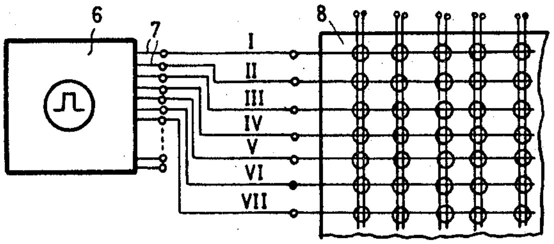
FIG. 2 represents an arrangement according to the invention.

In FIG. 2, showing an arrangement according to the invention, there is provided an impulse generator 6 which is over a number of lines 7, individually indicated by roman numerals I–VII, connected with the reading impulse lines of the matrix arrangement 8. The impulse generator produces the known reading impulses and, in accordance with the invention, also additional oppositely polarized regeneration pulses.

As noted before, FIG. 3 indicates an example for the allocation of the regeneration impulses along the time axis $t$. There are indicated four lines I–IV along which are conducted first the reading pulses 9 followed by the regeneration pulses 10. Letter A indicates the impulse amplitude.

In the example shown in FIG. 4, a reading impulse 9 conducted along a respective line is in point time immediately, or, under given conditions slightly spaced therefrom, followed by a regeneration impulse 10. After reading- and regeneration-pulses are conducted along a line, for example, the line I, there is effected extension of such pulses along the next line II, etc.

FIG. 5 shows an individual thin magnetizable layer element 2, a part of the reading impulse line 3, the writing-in line 4 and the sensing loop 5. The preferential magnetic direction, the socalled easy direction, does not extend in the layer element 2 exactly in parallel with the reading impulse line 3, but at a given angle $\alpha$ with respect thereto. According to the invention, an impulse sequence J comprising the reading impulse 9 and the regeneration impulse 10 is extended over the reading impulse line 3, such impulse sequence producing in the magnetic layer 2 magnetic fields oriented perpendicularly to the current direction in the magnetic layer. These magnetic impulse fields $H_J$ therefore likewise do not extend parallel to the magnetically hard direction HR but about at the same angle $\alpha$.

As has already been said, FIGS. 6–9 show by way of example the manner in which the magnetization acts in the case of a stored "Zero" corresponding to the "No" condition of the magnetizable layer.

Figure 6:
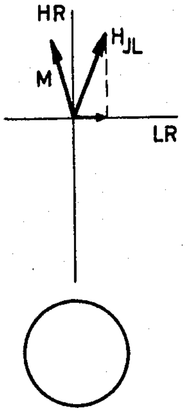
Figure 7:
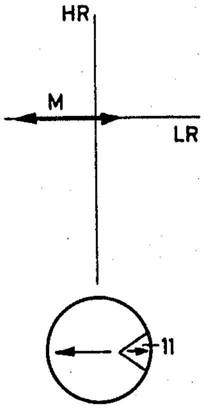

According to FIG. 6, the reading impulse produces a magnetic reading field $H_{JL}$ which displaces the magnetization by a given angle from the easy direction to this field $H_{JL}$. According to FIG. 7, the magnetization of the main region is upon disconnection of the reading impulse field, rotated or displaced back to its initial position, while a small area 11 is changed as to magnetization thereof. If the reading of the storage layer is now by a further reading impulse in known manner as often as desired continued, the change of magnetization of the layer will progressively increase. The partial region grows at the expense of the main region, so that the magnetization of the layer is finally changed by one half or more, occasioning the loss of the stored "Zero" or "No" condition. The reproducibility of the reading is not any more secured.

Figure 8:
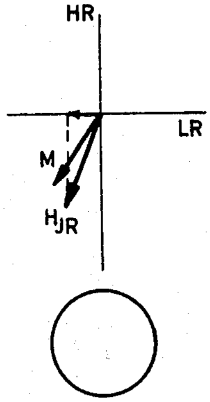

The allocation according to the invention, of a regenerating impulse, secures according to FIG. 8 the return magnetization of the small partial region by rotating or displacing the magnetization from the easy direction.

Figure 9:
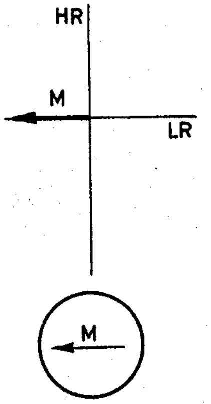

Upon disconnecting the regeneration field $H_{JR}$ according to FIG. 9, the magnetization will again lie in the easy direction and the entire layer is magnetically oriented in this direction. Incident to a renewed reading pulse, only a small part can suffer a change of magnetization, which is eliminated again by the action of the next regeneration impulse. The reproducibility of the reading is thus secured without the necessity of providing particular feedback devices or effecting entirely new storing.

As has been briefly explained before, FIGS. 10–13 illustrate an example of the manner in which the regeneration impulse affects the regenerative layer in the case, for example, of a stored "One" corresponding to the "Yes" condition of the storage layer. The actual magnetization structure of the layer is thereby ignored. After the triggering, the layer may be split into a multitude of domains which may be uniformly distributed over the layer.

Figure 10:
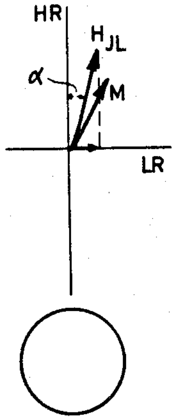
Figure 11:
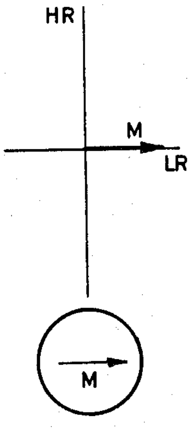
Figure 12:
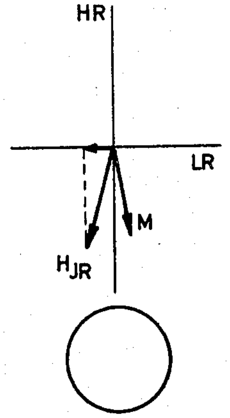
Figure 13:
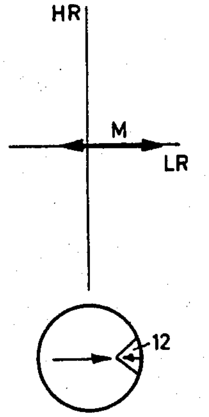

FIG. 10 shows the manner in which the magnetic reading field $H_{JL}$ which is produced by the reading impulse 9, rotates or displaces the magnetization of the layer from the easy direction LR by a given angle in the direction of the applied field. As shown in FIG. 11, upon disconnection of this field, the magnetization M again orients itself to the easy direction—according to the "Yes" condition. When a regeneration impulse is now conducted along the reading impulse line, as contemplated by the invention, such impulse will produce, as indicated in FIG. 12, a regeneration field $H_{JR}$ which is oppositely oriented with respect to the reading magnetic field. The magnetization M is likewise by a given angle rotated from the easy direction. As shown in FIG. 13, after the disconnection of the regeneration field, the main magnetization rotates back to the easy direction, while a small area 12 is likewise, but in opposite sense, magnetized in the easy direction. Upon conducting a further reading impulse over the line and producing in the layer a corresponding magnetic field, the small oppositely magnetized layer area is again changed in magnetization and the initial condition is thus restored.

The regeneration impulse need not follow after each reading impulse, but may also be transmitted after a series of reading impulses over the reading impulse line or a corresponding line. The strength or duration, respectively, of the corresponding regeneration impulse may be selected so that it produces an effect opposite to that produced by a reading impulse or a series of reading impulses. Accordingly, the regeneration impulse may be stronger and longer if it is applied with a frequency less than that of the reading impulses.

The advantages of the invention reside in that a reading is made possible which is free of disruption. This results in particular advantages in the construction of stores which can be read out as often as desired, without requiring the use of particular auxiliary switching or circuit elements, intermediate storers, feed back coupling members or the like. A quasi-static writing-in may even appear economically feasible in the case of very frequent reading. Moreover, the invention makes it possible to effect reading in any phase, incident to a reading pulse as well as the regeneration pulse, since the ascending flanks of both pulses can produce a voltage in the reading loop. Upon using the invention, the scattering of the preferential directions of the magnetization within the layer, in a matrix constructed of many layer elements, can likewise fluctuate within relatively wide limits. The regeneration impulse equalizes one-sidedness. The rotation angle for the magnetization can be made great upon reading, so that the signal voltage increases due to the increased angle.

Changes may be made within the scope and spirit of the appended claims which define what is believed to be new and desired to have protected by Letters Patent.

I claim:

1. An arrangement for the regeneration of magnetic conditions, decomposed by frequent reading operations, in a storage element comprising an individual thin magnetizable layer having a preferential axis of magnetization, comprising means disposed adjacent to, and cooperable with said layer for the conduction of write-in impulses to and read-out impulses from said layer, means for the conduction of reading and regenerating impulses to said layer, and impulse generation means operatively connected to said second mentioned means, which generates reading impulses of one polarity and regenerating impulses of opposite polarity, which are thereby conducted to said thin layer with the respective regenerating impulses being operative to generate a magnetic field in said layer which is oppositely directed to the magnetic field generated in such layer by the reading impulses, operative to effect a regeneration of the original magnetic condition of said thin magnetized layer, wherein said impulse generation means is constructed to allocate one regenerating impulse to a series of reading impulses.

2. An arrangement for the regeneration of magnetic conditions, decomposed by frequent reading operations, in a storage element comprising an individual thin magnetizable layer having a preferential axis of magnetization, comprising means disposed adjacent to, and cooperable with said layer for the conduction of write-in impulses to and read-out impulses from said layer, means for the conduction of reading and regenerating impulses to said layer, and impulse generation means operatively connected to said second mentioned means, which generates reading impulses of one polarity and regenerating impulses of opposite polarity, which are thereby conducted to said thin layer with the respective regenerating impulses being operative to generate a magnetic field in said layer which is oppositely directed to the magnetic field generated in such layer by the reading impulses, operative to effect a regeneration of the original magnetic condition of said thin magnetized layer, and means for utilizing the regenerating impulse for the reading.

References Cited

UNITED STATES PATENTS

| | | | |
|---|---|---|---|
| 3,015,807 | 1/1962 | Pohm et al. | 340—174 |
| 3,058,099 | 10/1962 | Williams | 340—174 |
| 3,054,094 | 9/1962 | Stuckert | 340—174 |
| 3,126,529 | 3/1964 | Hempel | 340—174 |
| 3,125,745 | 3/1964 | Oakland | 340—174 |

OTHER REFERENCES

Memory Techniques, by E. E. Bittman; Digest of Technical Papers, International Solid-State Circuits Conference, February 1959; pp. 22 and 23.

BERNARD KONICK, *Primary Examiner.*

I. L. SRAGOW, *Examiner.*

S. URYNOWICZ, *Assistant Examiner.*